United States Patent [19]

Speicher

[11] Patent Number: 4,557,191
[45] Date of Patent: Dec. 10, 1985

[54] MULTIPLE MOVEMENT MARKING MACHINE

[75] Inventor: Edwin W. Speicher, Pittsburgh, Pa.

[73] Assignee: M. E. Cunningham Company, Ingomar, Pa.

[21] Appl. No.: 631,192

[22] Filed: Jul. 16, 1984

[51] Int. Cl.⁴ .............................................. B41F 17/00
[52] U.S. Cl. ......................................... 101/4; 101/35; 400/121; 400/128; 901/14; 901/16
[58] Field of Search ..................... 901/16, 14, 18, 17; 414/718; 400/134, 128, 127, 121; 101/35, 4, 5, 6

[56] References Cited

U.S. PATENT DOCUMENTS

| | | | |
|---|---|---|---|
| 2,508,753 | 5/1950 | Farkas et al. | 101/269 |
| 2,619,030 | 11/1952 | Doyle | 101/6 |
| 2,641,996 | 6/1953 | Turner et al. | 101/4 |
| 3,146,699 | 9/1964 | Ayers | 101/35 |
| 3,163,106 | 12/1964 | Failor | 101/6 |
| 3,366,041 | 1/1968 | Krynytzky | 101/6 |
| 3,606,162 | 9/1971 | Lehmann | 101/35 X |
| 3,659,521 | 5/1972 | Lany | 101/35 X |
| 3,765,325 | 10/1973 | Warren | 101/6 |
| 3,800,696 | 4/1974 | Goto et al. | 101/6 |
| 3,867,882 | 2/1975 | Ahlgren et al. | 101/35 |
| 3,884,365 | 5/1975 | Thomson | 901/16 X |
| 3,888,362 | 6/1975 | Fletcher et al. | 901/16 X |
| 3,960,072 | 6/1976 | Ahlgren et al. | 101/35 |
| 3,984,009 | 10/1976 | Holroyd | 414/718 X |
| 4,362,977 | 12/1982 | Evans et al. | 901/16 X |
| 4,369,086 | 1/1983 | Nakahama et al. | 901/16 X |
| 4,433,953 | 2/1984 | Muench | 901/14 X |

*Primary Examiner*—Clifford D. Crowder
*Attorney, Agent, or Firm*—Stanley J. Price, Jr.

[57] ABSTRACT

A marking device for printing identification marks on the surface of an object, for example a series of billets conveyed in succession on a roll table, is mounted for vertical and pivotal movement on the end of an upper arm. The upper arm is movable along a first axis in a horizontal plane to extend and retract the marking head assembly into and out of marking position. The upper arm is supported by a carriage which is also movable in a horizontal plane parallel to the roll table along a second axis angularly positioned relative to the first axis. The upper arm is movable relative to the carriage, and the carriage is movable on a beam to carry the upper arm together with the marking device to a preselected position with respect to the objects to be marked on the roll table. The main beam for supporting the carriage is fixed to a base by a pivotal mounting for pivotal movement of the main beam about a horizontal axis by operation of a lift cylinder to move the marking device in an arcuate path into and out of marking position. Thus the marking device is movable in a plurality of directions in a horizontal plane, as well as vertically and rotationally about a vertical axis and also movable in a lifting operation through an arcuate path.

14 Claims, 11 Drawing Figures

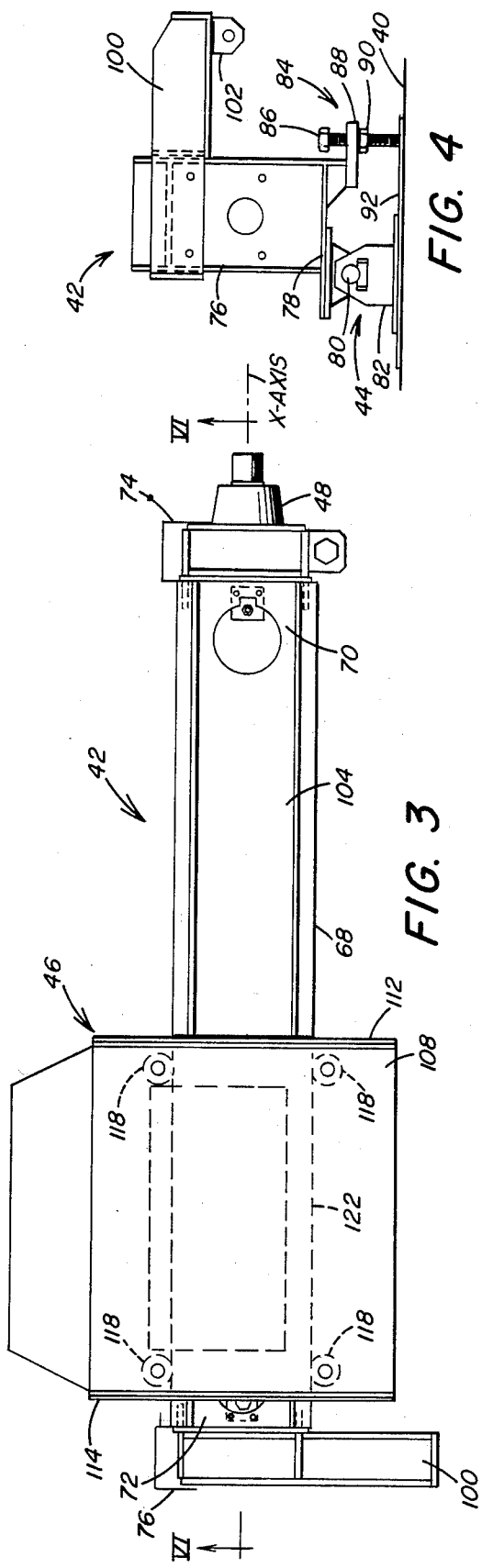
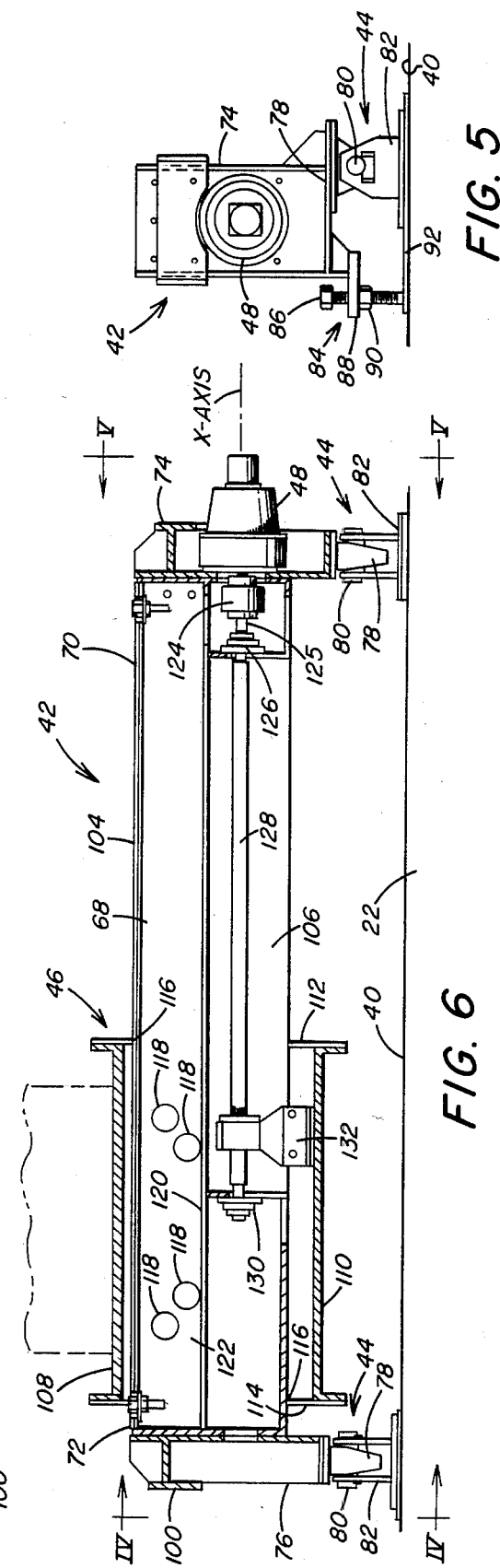

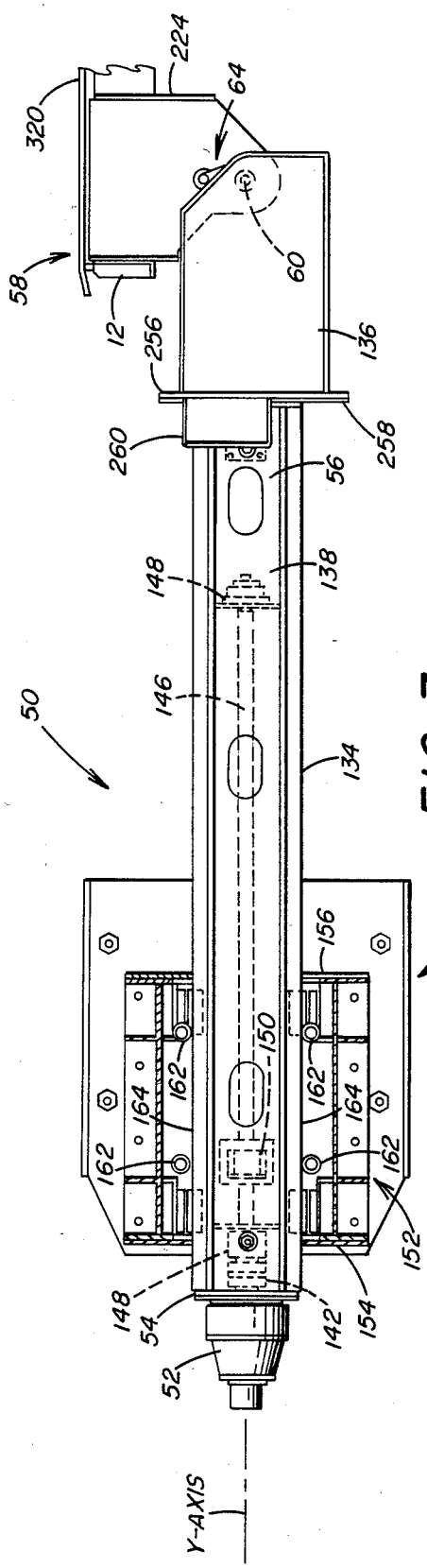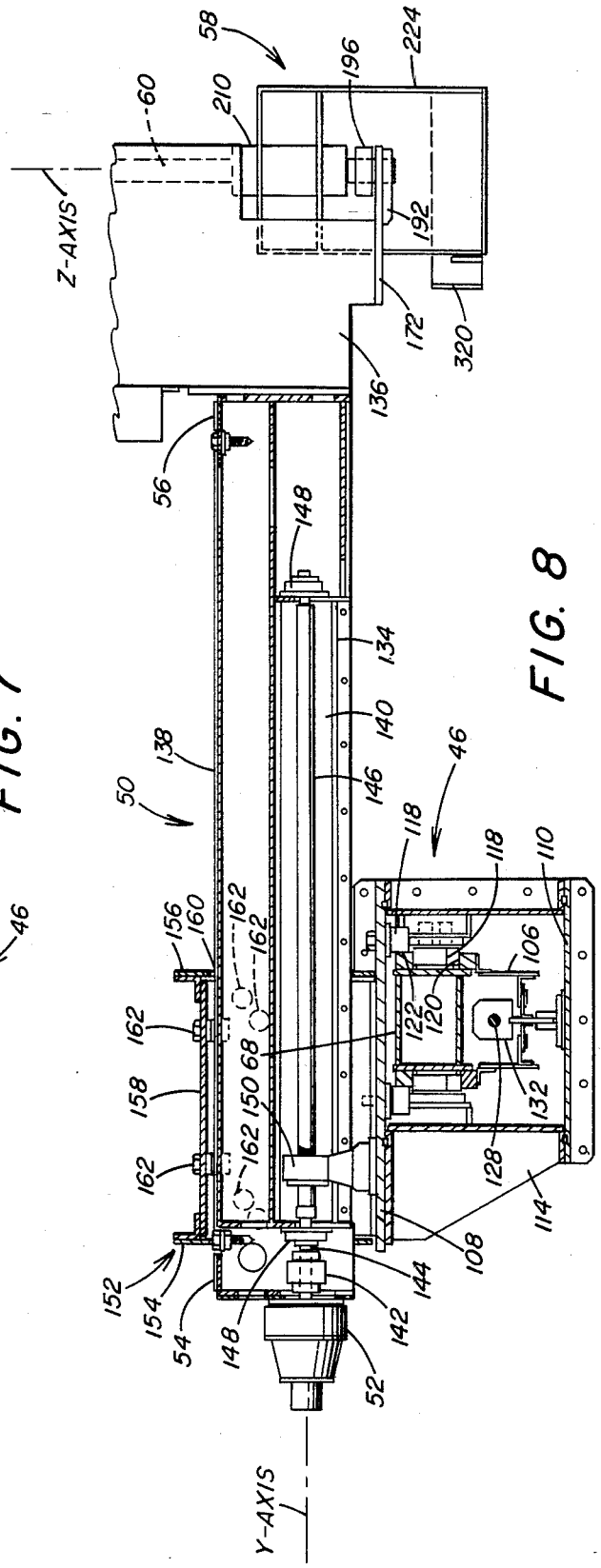
FIG. 7
FIG. 8

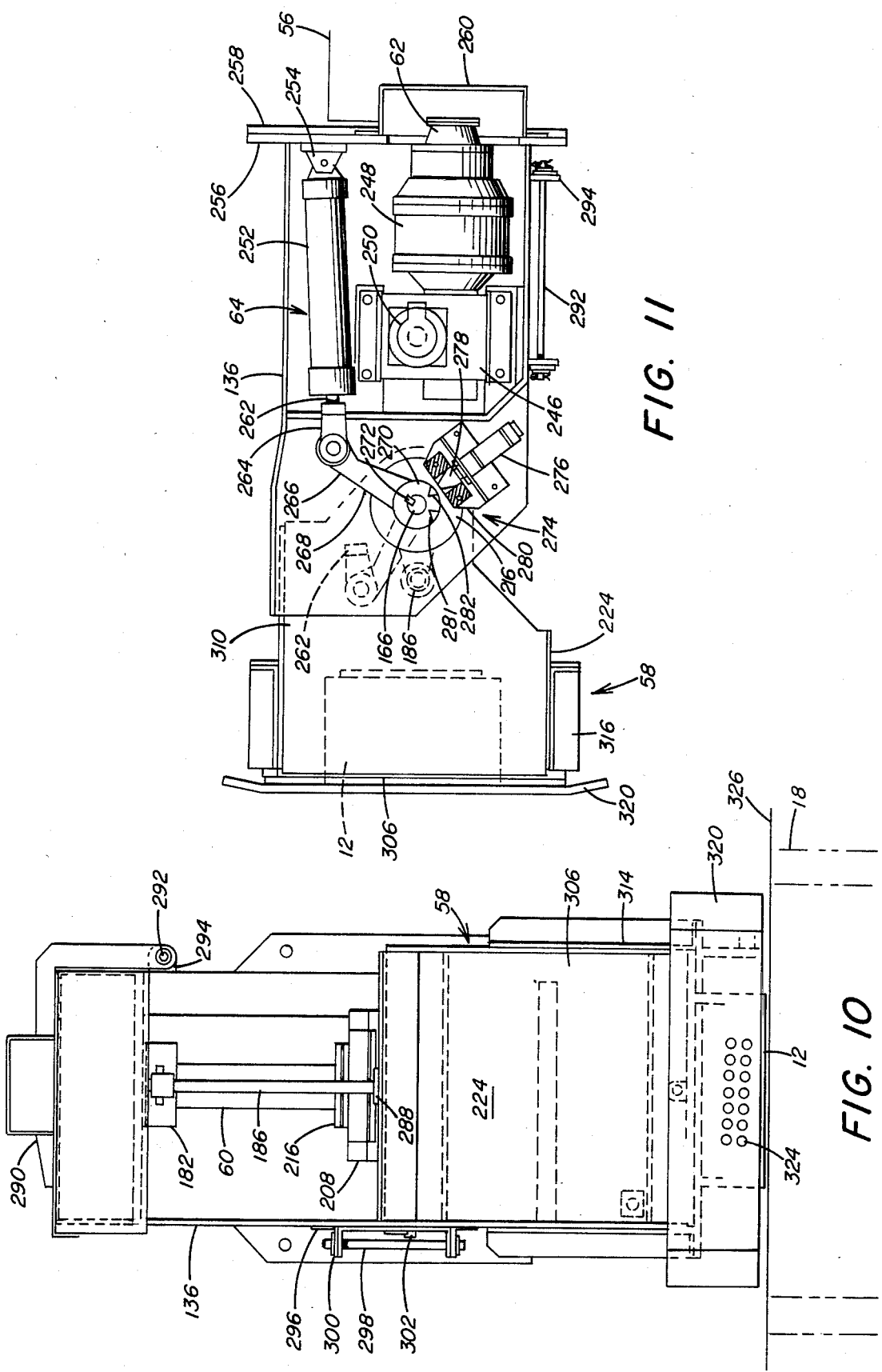

MULTIPLE MOVEMENT MARKING MACHINE

BACKGROUND OF THE INVENTION

1. Field of the Invention

This invention relates to apparatus for marking a workpiece and, more particularly, to a method and apparatus for supporting a marking device for movement on a frame through a plurality of degrees of movement to position the marking device to selectively impress identification marks on the surfaces of the workpieces being conveyed in a production line.

2. Description of the Prior Art

Machines for impressing identification marks on the surface of billets, slabs, plates, bars, ingots, and the like are well known in the art. In one known arrangement, the workpiece to be marked is conveyed by a roll table beneath the marking machine in a production line as disclosed in U.S. Pat. Nos. 3,541,954; 3,636,871 and 4,036,127. These devices include a marking device that carries marking elements which are moved into impact relation with the surface of the workpiece to impress an array of alphanumeric characters on the workpiece as the workpiece is conveyed in the production line. It is essential that the workpiece be marked without interrupting the production line.

One well known type of marking device is a single wheel marker that includes a marking wheel that carries a plurality of marking characters or elements on the peripheral surface thereof. An example of a single wheel marker is illustrated in U.S. Pat No. 4,214,520. U.S. Pat. Nos. 3,306,186; 3,541,954 and 3,636,871 discloses similar devices in which a marking head includes a plurality of marking wheels for marking billets, slabs, bars, rolled stock and the like.

With both single and multiple marking wheel markers, the respective marking wheel is rotated until the desired character on the wheel periphery is in marking position. The wheel is held in position by a suitable locking device and, thereafter, an actuator is remotely actuated to move the marking wheel to strike the billet and impress the selected character thereon. The marking wheel is then retracted and the wheel is incrementally rotated and moved laterally to the next position for marking the billet. The actuator is sequentially operated to move the marking head so that the character is stamped on the surface of the billet. This operation is repeated through the required sequence of steps to impress a series of marks on the billet.

Once the billet has been marked, the next billet must be moved into position for marking. This requires the marking head to be withdrawn to facilitate the movement of the next billet into position as rapidly as possible so that a number of billets can be marked in rapid succession. To accomplish this the marking wheel must be efficiently moved into and out of the marking position. Further, after each billet is marked, the sequence of characters must be changed. This requires moving the marking wheel to stamp the billet and rotating the marking wheel to place the next desired character in marking position. Once the desired series of characters have been impressed on the billet by incremental lateral movement of the marking wheel, it is necessary to return the marking wheel to the initial marking position for marking the next billet.

Thus in order to successfully mark a plurality of workpieces moving successively in a production line, the marking device must be supported for rapid movement into and out of the marking position. The marking characters must be rapidly changed on the marking head to permit marking the workpieces in rapid succession without interrupting the movement of the workpieces in the production line. Consequently, delays in the movement of the marking device into and out of the marking position and changing of the marking characters on the marking head will interrupt the production line.

More recently, in an effort to increase the speed of the marking operation and to reduce the time required to change the combination of alphanumeric characters for a message to be inscribed, non-contact markers, such as ink jet or spray printers, have been utilized. However, their use has been predominantly confined to imprinting on a recording medium, such as paper. Known ink jet or spray markers are disclosed in U.S. Pat. Nos. 3,787,884; 4,272,733; 4,356,499; 4,376,284; 4,412,232; and 4,415,909.

In particular, U.S. Pat. No. 4,412,232 discloses a wheel which is rotatably mounted on a housing of a printhead to support the housing for manual movement over the surface of the medium onto which characters are to be printed. The printhead contains a plurality of nozzles which are actuated by movement of the wheel on the surface of the recording medium. The nozzles are arranged in a straight line extending transversely to the direction of the printhead movement. Data processing equipment provides signals to control driver circuits to uniformly print the desired characters in the dot matrix pattern.

U.S. Pat. No. 4,415,909 discloses an ink jet printer having an arrangement of nozzles in a symmetrical pattern. A drive element is associated with each nozzle, and a piezoelectric crystal initiates the formation of ink droplets by pulsing the ink supply inside a tube associated with each nozzle and causing the ink to be ejected from the nozzle in droplet form. The nozzle array is formed in a pattern to generate equally separated rows of dots on the record media or paper. The printhead is moved along a line of printing with the line of symmetry being at an angle relative to the direction of motion to produce a vertical column of dots perpendicular to the direction of movement. The times for energizing the individual print elements is controlled to minimize the gap between the nozzles to thus enable dot matrix type printing.

While the prior art devices disclose marking machines that utilize single and multiple marking wheel markers for impressing identification marks on billets, slabs, bars and the like, the speed at which the wheels are moved into and out of position and the movement of the wheels to change the series of characters to be marked limit the rate at which the workpieces to be marked are advanced in the production line. Therefore, there is need for a marking machine for use in high speed marking of workpieces in a production line where the workpieces are successively marked by dot matrix characters in which the make up of the characters to be stamped on the workpiece is quickly adjusted from one workpiece to another without interrupting movement of the workpieces in the production line.

SUMMARY OF THE INVENTION

In accordance with the present invention, there is provided apparatus for supporting a marking device for movement into position for marking the surface of an object that includes a base. A lower support member is positioned on the base. The lower support member has a surface extending in a horizontal plane above the base. A carriage is positioned on the lower support member for movement in a preselected direction in the horizontal plane. First drive means is drivingly connected to the carriage for moving the carriage to a preselected position on the lower support member. An upper support member is supported by the carriage for movement relative to the carriage in a horizontal plane in a preselected direction with respect to the direction of movement of the carriage on the lower support member. Second drive means is drivingly connected to the upper support member for moving the upper support member to a preselected position relative to the position of the carriage on the lower support member. A marking device is carried by the upper support member. Means is provided for connecting the marking device to the upper support member for movement in a preselected direction to a preselected position relative to the upper support member. Means is also provided for moving the lower support member relative to the base to adjust the position of the marking device with respect to the base.

Further in accordance with the present invention, there is provided a mechanism for supporting a machine for movement in a plurality of axes oriented in spatial relation, one from another, that includes a base. The machine is positioned above the base. A first support arm is connected to the base and extends on the base in a preselected direction defining an X-axis of movement. A second support arm is spaced from the first support arm above the base. The second support arm extends relative to the first support arm in a preselected direction defining a Y-axis of movement. The Y-axis of movement is positioned in preselected, spatial relation with respect to the X-axis of movement. A link movably connects the first and second support arms to permit relative movement between said first and second support arms along the X- and Y-axes of movement. The link is movable relative to the first support arm along the X-axis. The second support arm is movable relative to the link along the Y-axis. The machine is positioned on the second support arm for movement in a preselected direction defining a Z-axis of movement. The X-axis of movement is positioned in preselected, spatial relation with respect to both the X- and Y-axes of movement.

Additionally in accordance with the present invention, there is provided a method for supporting a marking machine for movement into position for marking a surface of an object that includes supporting a marking machine on a frame for movement into marking relation with the surface of an object to be marked. The marking machine is moved along a first axis in a horizontal plane to a preselected position on the frame. The marking machine is moved along a second axis in a horizontal plane to a preselected position on a frame. The second axis is oriented in preselected, spatial relation with respect to the first axis. The marking machine is moved to a preselected position along a third axis in a vertical plane to a preselected position above the frame. The position of the marking machine is angularly adjusted to impress a mark on a selected surface of the object to be marked.

Accordingly, the principal object of the present invention is to provide apparatus for supporting a marking device for movement in a plurality of directions through a plurality of degrees of movement for selective positioning of the marking device with respect to the surface of an object to be marked.

Another object of the present invention is to provide a device for impressing identification marks on a selected surface of a billet by a marking device positioned on a frame for movement along a plurality of horizontal axes positioned in spatial relation, as well as along a vertical axis, and further through an arcuate path for marking the billet on a selected one of the ends or sides of the billet.

An additional object of the present invention is to provide an automated marking machine for sequentially inscribing selected identification marks on workpieces moving in succession in a production line.

A further object of the present invention is to provide a marking machine that includes a marking head assembly supported for movement in a plurality of axes arranged in spatial relation in order to locate the marking head assembly in position for impressing an identification mark at a selected location on a workpiece.

A further object of the present invention is to provide a robotics positioning mechanism for supporting a machine for movement in a plurality of axes oriented in spatial relation one from another so that the machine can be located in a preselected position for performing a specific function.

Another object of the present invention is to provide a method for supporting a marking machine for movement into position for marking the surface of an object by moving the marking machine through a plurality of degrees of movement on a frame.

These and other objects of the present invention will be more completely disclosed and described in the following specification, the accompanying drawings, and the appended claims.

BRIEF DESCRIPTION OF THE DRAWINGS

FIG. 3 is an enlarged plane view of a lower support assembly mounted on the base of the marking machine, illustrating a carriage for moving the marking head assembly in a horizontal plane along an X-axis.

FIG. 4 is an end view of the lower support assembly taken along line IV—IV of FIG. 3.

FIG. 5 is an opposite end view of the lower support assembly taken along line V—V of FIG. 3.

FIG. 6 is a sectional view of the lower support assembly taken along line VI—VI of FIG. 3, illustrating the drive mechanism for moving the carriage in a horizontal plane along the X-axis.

FIG. 7 is an enlarged fragmentary plane view, partially in section, of an upper support assembly of the marking machine, illustrating the marking head assembly supported on the end of an upper arm which is movable in a horizontal plane along a Y-axis relative to the carriage.

FIG. 8 is an enlarged fragmentary elevational view, partially in section, of the upper support assembly shown in FIG. 7, illustrating the drive mechanism for reciprocating the upper arm on the carriage to move the marking head assembly in a horizontal plane along the Y-axis.

FIG. 10 is an end view of the marking head assembly shown in FIG. 9.

FIG. 11 is a top plan view, partially in section, of the marking head assembly shown in FIG. 9, illustrating the mechanisms for rotationally and vertically moving the marking head assembly relative to the upper arm.

DESCRIPTION OF THE PREFERRED EMBODIMENTS

Figure 1:
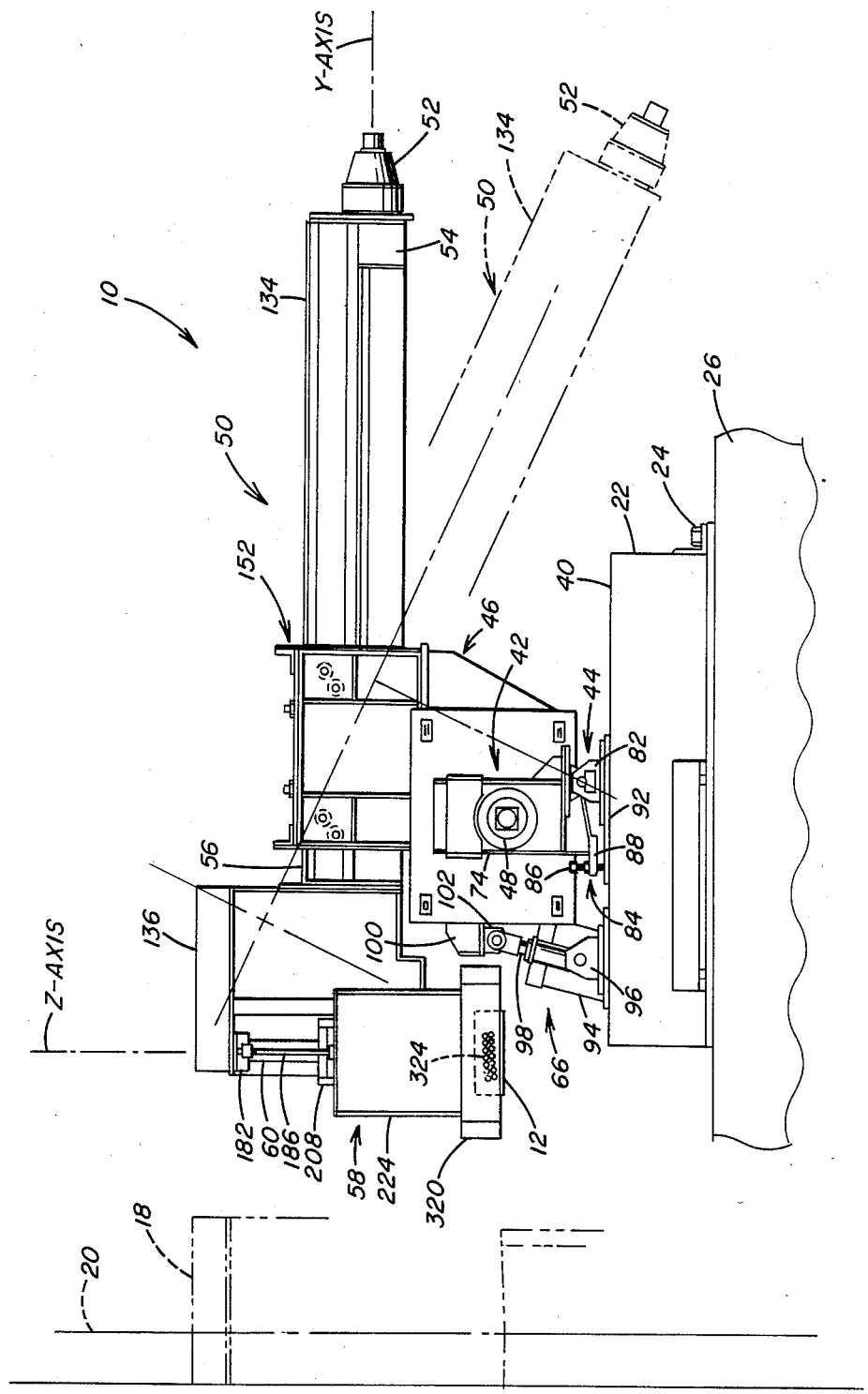
FIG. 1 is a view in side elevation of a multiple movement marking machine, illustrating a marking head assembly supported on a base for movement in a plurality of directions to position a marking device for impressing identification marks on workpieces being successively advanced on a roll table shown in phantom in FIG. 1.
Figure 2:
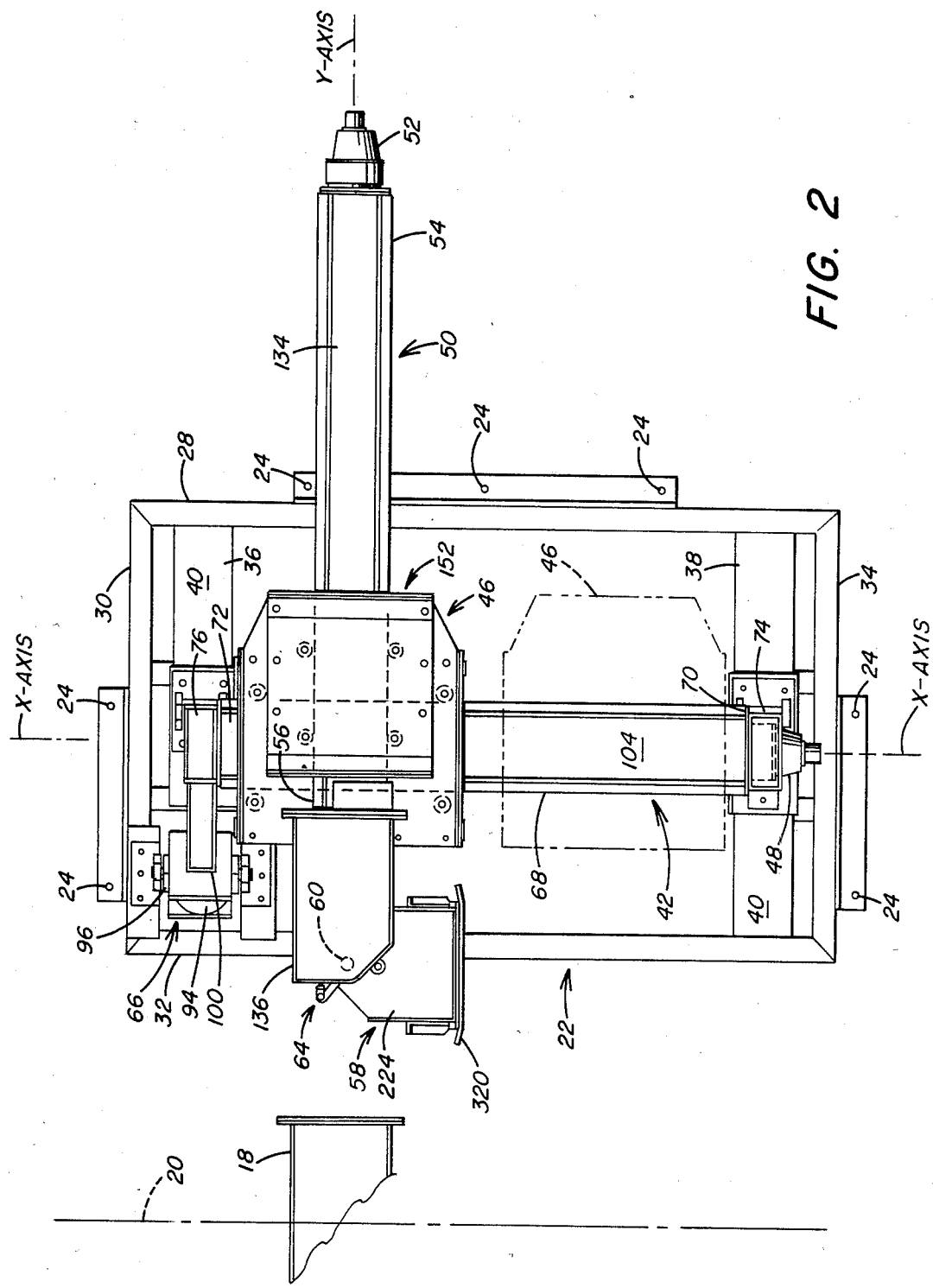
FIG. 2 is a top plan view of the marking machine shown in FIG. 1, illustrating the marking head assembly supported for movement in a plurality of directions to selectively position the marking device with respect to the workpieces conveyed on the roll table.

Referring to the drawings and particularly to FIGS. 1 and 2, there is illustrated a marking apparatus generally designated by the numeral 10 for supporting a marking device 12 for movement into and out of position for marking the surface of an object, such as billets, slabs, bars, rolled stock, and the like with identification marks.

The objects to be marked, such as billets (not shown) are conveyed in succession in a production line on suitable conveying means. One type of known conveying means for moving billets past the marking device 12 is a conventional roll bed or table 18 illustrated in phantom in FIG. 1. The roll table 18 includes suitable driven rollers to advance the objects to be marked in succession one after another. The roll table 18 has a center line 20 also diagrammatically illustrated in FIG. 1. The objects to be marked, such as billets, are conveyed in succession, and as each billet advances past the marking device 12 which is moved in a manner explained later in greater detail into marking position, a series of identification marks, such as alphanumeric marks, are impressed, stamped or sprayed on a selected surface of the object to be marked by the marking device 12. However, it should be understood that the present invention is adaptable to mark a variety of types of objects other than billets, such as pipes, various forms of conduit, and other objects such as sheet metal parts and machine components that are required to be identified by suitable marking. In addition, as will be explained later in greater detail, the present invention is also applicable as an automatic positioning system or robot for many types of machines used in manufacturing processes, such as welding, metal forming, and handling components in an assembly operation.

The marking device 12 illustrated in FIGS. 1 and 2 is positioned on the marking apparatus 10 for selective movement in a plurality of horizontal planes, as well as movement vertically, pivotally, and in an arcuate path relative to the roll table 18. The marking apparatus 10 includes a fixed base 22 which is connected by suitable means, such as bolts 24, to a foundation 26. The base 22 as shown in greater detail in FIG. 2 is formed by a plurality of beam-like members 28-34 connected together to form a rectangular frame with transverse support beams 36 and 38 extending between and connected to the beams 28 and 32. With this arrangement, a rigid support structure is provided for supporting the marking apparatus 10 and, in particular, the marking device 12 for movement in a selected direction above the base 22.

With this arrangement the frame structured by the beams 28-38 provides horizontal surfaces 40 on the transverse beams 36 and 38 for supporting the marking apparatus 10. A lower support member or assembly generally designated by the numeral 42 is positioned on the horizontal surfaces 40 and extends substantially the length of the base 22. Preferably the lower support assembly 42 extends longitudinally parallel to the beams 28 and 32, as shown in FIG. 2.

The lower support assembly 42 is mounted on supports generally designated by the numeral 44 in FIGS. 1 and 4-6 for pivotal movement about a horizontal X-axis above the surface 40. A carriage 46 is positioned for reciprocal movement back and forth on the lower support assembly 42 in a horizontal plane along the X-axis. The movement of the carriage 46 on the lower support assembly 42 along the X-axis relative to the roll table 18 is diagrammatically illustrated in phantom in FIG. 2. As seen in FIG. 2, the X-axis of movement of the carriage 46 is parallel to the center line 20 of the roll table 18.

A motor 48 mounted on one end of the lower support assembly 42 is drivingly connected to the carriage 46 for rectilinearly advancing the carriage 46 along the X-axis to a preselected position on the lower support assembly 42. In this manner the carriage 46 moves horizontally left and right relative to the roll table 18. The details of the drive connection of the motor 48 to the carriage 46 illustrated in FIGS. 6 and 8 will be described later in greater detail.

An upper support member or assembly, generally designated by the numeral 50 in FIGS. 1 and 2 and in further detail in FIGS. 7 and 8, is supported by the carriage 46 for movement of the upper support assembly 50 relative to the carriage 46 in a horizontal plane above the horizontal plane of movement of the carriage 46 on the lower support assembly 42. The upper support assembly 50 is rectilinearly movable in a preselected direction along a Y-axis illustrated in FIGS. 1, 2, 7 and 8. The Y-axis of movement of the upper support assembly 50 is illustrated perpendicular to the X-axis direction of movement of the carriage 46, but the spatial relationship between the X and Y-axes is selective, for example the X- and Y-axes can be positioned 45° apart or at any other angle.

As shown in FIG. 2, the Y-axis of movement of the upper support assembly 50 is perpendicular to the center line 20 of the roll table 18. The Y-axis is in a horizontal plane positioned parallel and above the horizontal plane of the X-axis. In a manner similar to the movement of the carriage 46 on the lower support assembly 42, the upper support assembly 50 includes a motor 52 drivingly connected to the upper support assembly 50 for actuating reciprocal rectilinear movement of the upper support assembly 50 horizontally in and out or toward and away from the roll table 18. The details of the drive connection of the motor 52 to the upper support assembly 50 will also be described later in greater detail.

The movement of the carriage 46 on the lower support assembly 42 also generates movement of the upper support assembly 50 with the carriage 46 on the X-axis of movement. Thus the carriage 46 functions as link connecting the upper and lower support assemblies 42 and 50. The direction of movement of the carriage 46 is parallel to the roll table 18 which is also referred to as left and right horizontal movement of the carriage 46.

The upper support assembly 50 moves with the carriage 46. The upper support assembly 50, however, is movable toward and away or in and out relative to the roll table independently of the movement of the carriage 46. With this arrangement, once the carriage 46 has been moved to the desired location on the lower support assembly 42, the upper support assembly 50 is moved toward and away from the roll table 18 on the carriage 46. Thus the upper support assembly 50 is both movable with the carriage 46 and relative to the carriage 46.

The upper support assembly 50, as illustrated in FIGS. 7 and 8, includes a first end portion 54 where the motor 52 is mounted on a second end portion 56. A marking head assembly, generally designated by the numeral 58, is connected to the second end portion 56 for vertical movement along a Z-axis and pivotal movement about the Z-axis. Mounted on the marking head assembly 58 for movement into and out of marking position relative to the objects to be marked, as conveyed on the roll table 18, is the marking device 12. The marking device 12 is carried by the marking head assembly 58 for vertical movement along a Z-axis on the assembly 58 and also for rotational movement about the Z-axis.

Figure 9:
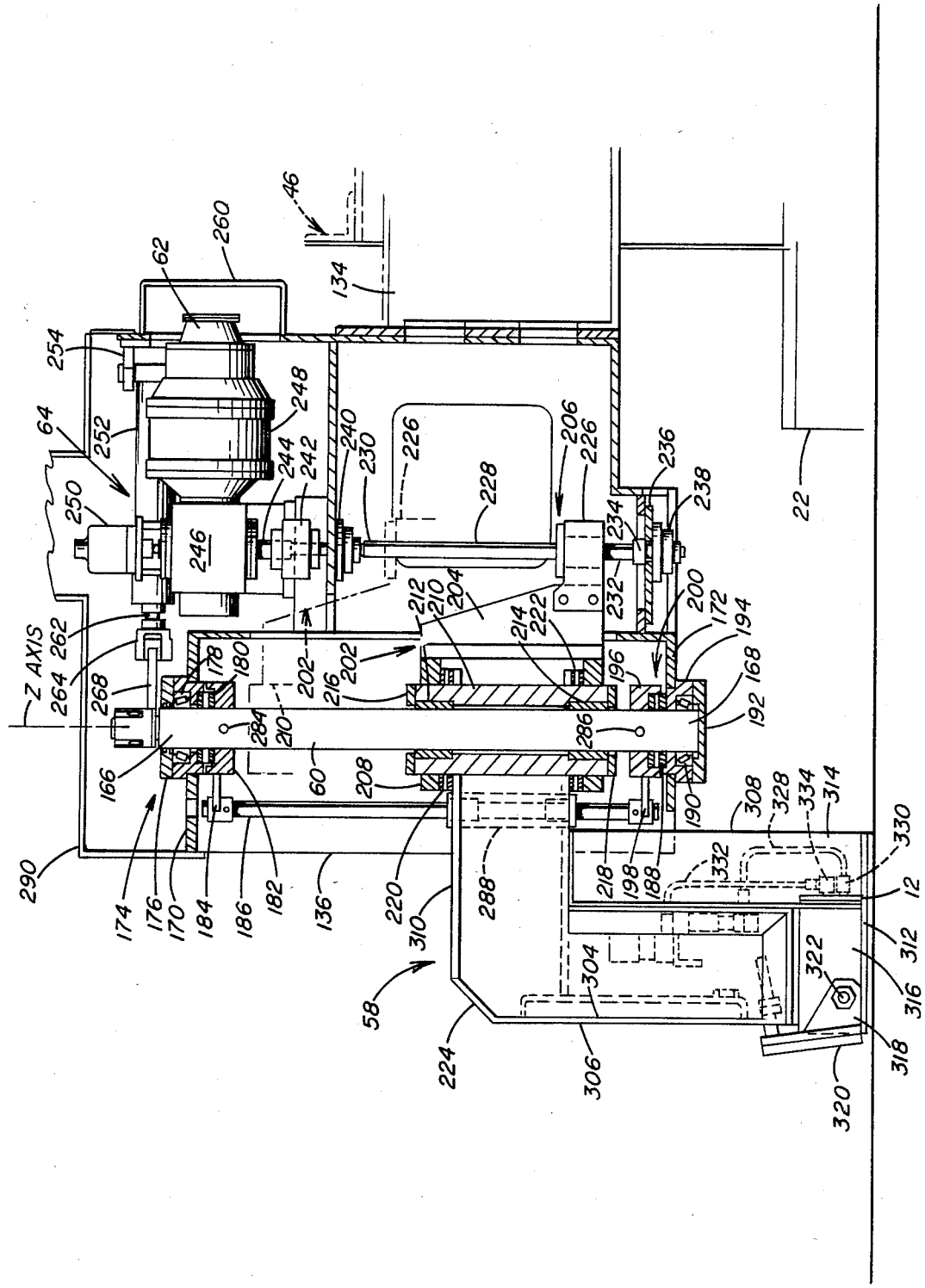
FIG. 9 is an enlarged fragmentary, sectional view in side elevation of the marking head assembly, illustrating the marking device supported by the assembly.

The marking head assembly 58, as illustrated in detail in FIGS. 9-11, is mounted for vertical movement on a shaft 60 by operation of a motor 62 carried on the end 56 of the upper support 50. Also, the assembly 58 is pivotal about the shaft 60 by the operation of a double acting piston cylinder assembly, generally designated by the numeral 64 in FIGS. 9 and 11. The shaft 60 defines the Z-axis of movement of the marking head assembly 58.

The marking device 12 is movable to a preselected position with respect to the center line 20 of the roll table 18. The final or marking position is reached by movement of the marking device 12 with the marking head assembly horizontally along the X- and Y-axes and vertically along the Z-axis, as well as pivotally about the Z-axis. In addition to these multiple degrees of movement, the marking head assembly 58, together with the upper support assembly 50, the carriage 46 and the lower support assembly 42, are all pivotal as a single unit about the X-axis by operation of a lift cylinder generally designated by the numeral 66 in FIGS. 1 and 2.

Actuation of the lift cylinder 66 moves the marking device 12 through an arcuate path to lift the marking device 12 up and down relative to the roll table 18. The lifting movement up and down is in an arcuate path, and the position of the upper support assembly 42 in the up position is indicated in phantom in FIG. 1. In the down position the marking device 12 is in position for marking the objects on the roll table 18. In the up position, the marking device 12 is moved away from the roll table 18 so as not to obstruct movement of the objects on the roll table 18.

Now referring to FIGS. 3-6, there is illustrated the details of the lower support assembly 42 and the carriage 46 which is rectilinearly movable on the assembly 42 along the X-axis. The lower support assembly 42 is a longitudinal beam or arm-like structure that includes a main beam 68 having end portions 70 and 72 with upstanding brackets 74 and 76 connected to the end portions 70 and 72, respectively. The brackets 74 and 76 are pivotally mounted on the horizontal surface 40 of the base 22 by the supports 44.

The pivotal support of the brackets 74 and 76 is accomplished by pivot end portions 78 of brackets 74 and 76. Each support 44 includes a pivot pin 80 extending through each pivot end portion 78 and a clevis assembly 82 which is securely bolted to the surface 40 of base 22. Thus the pivot end portion 78 of each bracket 74 and 76 is pivotal on the clevis assembly 82 about the pivot pin 80. With this arrangement the main beam 68 is pivoted about a horizontal axis through the pivot pins 80. Pivoting the main beam 68 moves the marking head assembly 58 through an arcuate path to lift the marking device 12 up and down as above described.

As seen in FIGS. 4 and 5, a pivot locking device generally designated by the numeral 84 is secured to the pivot end portion 78 of each bracket 74 and 76 spaced oppositely from the clevis assembly 82. The pivot locking device 84 includes a screw 86 extending through a flange plate 88 on each bracket pivot end portion 78 into abutment with a plate 92 that supports the brackets 74 and 76 on the upper surface 40 of the base 22. Once the main beam 68 has been pivoted to the desired position on the base 22, the screw 86 is advanced through the flange plate 88 to abut the plate 92. The screw 88 is locked in position on the plate 88 by tightening a jam nut 90 on the screw into contact with the plate 88.

Pivotal movement of the main beam 68 is accomplished by actuation of the lift cylinder 66, shown in FIGS. 1 and 2. Preferably the lift cylinder 66 is an air operated piston cylinder assembly that includes a cylinder portion 94 pivotally mounted by a bracket 96 to the base 22. A piston rod 98 is extensible from and retractable into the cylinder portion 94. The upper end portion of the piston rod 98 is connected to an arm bracket 100 which, as shown in FIG. 4, extends outwardly from the upstanding bracket 76 on the main beam end portion 72. A depending portion 102 on the bracket arm 100 is adapted for connection to the outer end portion of the piston rod 98 (not shown in FIG. 4).

The piston cylinder assembly 66 is remotely controllable to extend and retract the piston arm 98 to in turn pivot the lower support assembly 42 about its pivotal connection with the clevis assembly 82 on the base 22. The lower support assembly 42 is pivotal about a horizontal axis extending through the pivot pins 80. When the desired pivoted positioned of the lower support assembly 42 is obtained, the screw 86 is advanced into abutting relation with the plate 92 and locked in the desired position by the nut 90. This secures and stabilizes the pivoted position of the lower support assembly 42 as well as the entire marking apparatus 10.

By operation of the lift cylinder 66, lifting of the marking device 12 between the up position and the down position is accomplished. Preferably, the lift cylinder 66 is operated by a 4-way two position solenoid operated value with a spring return. When the marking device 12 is in the up position, power is removed from the solenoid so that the objects to be marked on the roll table 18 will be clear of the marking device 12 in the event of a power failure. Accordingly, actuation of the solenoid operated valve for the lift cylinder 66 retracts the piston rod 90 to move the marking device 12 to the down position for marking the workpieces on the roll table 18.

The main beam 68, as shown in FIGS. 3 and 6 of the lower support assembly 42, includes an upper horizontal surface 104 extending substantially the length of the main beam 68 between the upstanding brackets 74 and 76. The carriage 46 is roller mounted for reciprocal, rectilinear movement on the horizontal surface 104 along the X-axis. Movement of the carriage 46 on the upper horizontal surface 104 along the X-axis generates corresponding movement of the marking head assembly 58 and the marking device 12.

As seen in FIG. 6, the main beam 68 has a longitudinally extending rectangular configuration forming an enclosure 106. The carriage 46 has a configuration corresponding to the box-like configuration of the beam 68 to permit the carriage 46 to slidably move back and forth on the surface 104 substantially the length of the beam 68. As seen in FIGS. 3 and 6, the carriage 46 is formed by a top plate 108 connected to a bottom plate 110 by vertical plates 112 and 114. The vertical plates 112 and 114 have openings 116 for receiving the main beam 68. The openings 116 have a configuration corresponding to the configuration of the main beam 68 to permit the carriage 46 to reciprocate back and forth in a horizontal plane along the X-axis.

The carriage 46 is movably supported on the main beam 68 by a plurality of roller devices 118 shown in FIG. 8 and schematically illustrated in FIGS. 3 and 6. The roller devices 118 are securely connected to the carriage 46 to engage surfaces 120 and 122 of the main beam 68. As illustrated in FIGS. 3, 6 and 8, surface 120 extends horizontally, and surface 122 extends vertically on the main beam 68. The roller devices 118 rotatably engage the respective surfaces 120 and 122 to permit movement of the carriage 46 in a horizontal plane along the X-axis on the main beam 68.

Movement of the carriage 46 on the main beam 68 is accomplished by actuation of the motor 48. The motor 48 is a conventional DC servo-drive motor that includes what is known in the art as a tachometer and encoder for generating 120 pulses per revolution, or 600 pulses per inch. The motor 48 is supported on the bracket 74 at the end portion 70 of the main beam 68. The motor 48 is drivingly connected, as shown in FIG. 6, to a gear coupling 124. The gear coupling 124 is positioned within the main beam enclosure 106 and includes a drive shaft 125 connected through a shaft seal 126 to one end of a ball screw 128. The opposite end of the ball screw 128 is rotatably supported by a second shaft seal 130 within the main beam enclosure 106.

A ball screw guide 132 is rigidly mounted on the bottom plate 110 of the carriage 46. The ball screw guide 132, in a manner well known in the art, drivingly engages the ball screw 128. Upon rotation of the ball screw 128 by actuation of the motor 48, the ball screw guide 132 moves longitudinally on the ball screw 128 between the shaft seals 126 and 130. Consequently, as the ball screw guide 132 moves the carriage 46 moves with it by movement of the roller devices 118 on the roller surfaces 120 and 122 of the main beam 68.

In accordance with the method of operation of the present invention, actuation of the motor 48 moves the carriage 46 to move the marking device 12 in a horizontal plane along the X-axis. This direction of movement is also identified as the horizontal left and right movement of the marking device 12 with respect to the roll table 18.

Movement of the carriage 46 in the above described manner on the lower support assembly 42 also moves the upper support assembly 50 in the same direction which is in a horizontal plane along the X-axis. In addition, the upper support assembly 50 is movable independently of the carriage 46 also in a horizontal plane but along the Y-axis, as indicated in FIGS. 1 and 2. In this manner the marking device 12 is moved horizontally between an in position and an out position with respect to the roll table 18. In the out position, the marking device 12 is positioned over the roll table 18, and in the in position the marking device 12 is removed from overlying relation with the roll table 18 or is in the "home" position.

As illustrated in detail in FIGS. 7 and 8, the upper support assembly 50 includes an upper arm or beam 134 similar in construction to the above described main beam 68. The upper arm 134 is a longitudinally extending box-like beam having a rectangular cross section and including the end portion 54 for supporting the motor 52 and the end portion 56 for supporting the marking head assembly 58. Secured to and extending outwardly from the upper arm end portion 56 is a housing 136. The marking head assembly 58, as will be explained later in greater detail, is mounted for both vertical and pivotal movement on the housing 136.

The upper arm 134 shown in FIG. 8 includes an upper horizontal surface 138 and an enclosure 140 for receiving the drive connection from the motor 52. With the carriage 46 being positioned for reciprocal, rectilinear movement on the main beam 68, the upper arm 134 is positioned for reciprocal, rectilinear movement relative to the carriage 46. The carriage 46 moves along the X-axis on the main beam 68, and the upper arm 134 moves along the Y-axis on the carriage 46. The X and Y-axes are oriented perpendicular to one another, but it should be understood that the respective directions of the X- and Y-axes, as well as their special relation with respect to each other, is selective and is not limited to overlying horizontal planes which are perpendicular to one another.

The motor 52 is the same type of motor as above described for the motor 48 and basically operates in the same manner. The motor 52, as shown in FIG. 8, is drivingly connected to a gear coupling 142 having a drive shaft 144 drivingly connected to one end of a ball screw 146. The drive shaft 144 extends through a shaft seal 148 into the enclosure 140 where the ball screw 146 is positioned. The opposite end of the ball screw 146 is suitably supported by the upper arm 134 and is connected to a second shaft seal 148. A ball screw guide 150 is drivingly connected in a conventional manner to the ball screw 146. The ball screw guide 150 is secured to the carriage top plate 108.

As further illustrated in FIGS. 7 and 8, the carriage 46 includes an upper portion generally designated by the numeral 152 having a rectangular configuration formed by a pair of parallel plates 154 and 156 mounted on the top plate 108. Secured to and extending between the plates 154 and 156 is a cover plate 158. The cover plate 158 is spaced above the top plate 108 to receive therebetween the upper arm 134. Each of the vertical plates 154 and 156 of the carriage upper portion 152 includes an opening 160 for receiving the upper arm 134. A plurality of roller devices 162 are secured to the various plates 154–158 of the carriage upper portion 152 for rotatable engagement with a roller surface 164 (shown in FIG. 7) of the upper arm 134.

With this arrangement the upper arm 134 is supported for reciprocal, rectilinear movement in a horizontal plane along the Y-axis through the carriage upper portion 152. The reciprocal movement of the arm 134 along the Y-axis is accomplished by actuation of the motor 42 to transmit drive through the gear coupling 142, drive shaft 144, and the shaft seal 148 of ball screw 146. With the ball screw guide 150 being secured to the top plate 108 of the carriage 46, rotation of the ball screw 146 in a preselected direction relative to the fixed ball screw guide 150 generates rectilinear movement of the upper arm 134 through the openings 160 in the carriage plates 154 and 156 on the roller devices 162. The roller devices 162 serve to maintain the movement of the upper arm 134 in a horizontal plane along the Y-axis.

As with the ball screw 128 described for the lower support assembly 42, the ball screw 146 for the upper support assembly 50 is rotational in a preselected direction to reciprocate the upper arm 134 in a rectilinear manner relative to the carriage 46. Preferably the direction of movement of the upper arm 134 moves the marking head assembly 58 and the marking device 12 horizontally as above described in and out with respect to the roll table 18. Thus once the upper support assembly 50 has been advanced to the desired location by movement of the carriage 46 to the desired position on the main beam 68, the upper arm 134 is extended from the carriage 46, as illustrated in FIGS. 7 and 8, to the out position over the roll table 18. FIGS. 1 and 2 illustrate the in or "home" position of the upper arm 134 on the carriage 46 where the marking device 12 is removed from marking position over the roll table 18.

Thus, it is the horizontal left and right movement of the carriage 46 on the main beam 68 along the X-axis which locates the marking head assembly 58 in the desired position oppositely from the roll table 18. It is then the horizontal in and out movement of the upper arm 134 relative to the carriage which moves the marking head assembly 58 into and out of position over the roll table 18.

Further in accordance with the present invention, once the marking head assembly 58 has been advanced by movement of the upper arm 134 horizontally into the out position where the marking device 12 is positioned over the roll table 18, the vertical position of the marking head assembly 58 on the upper arm 134 is adjusted. The position of the marking head assembly 58 on the upper arm 134 is vertically adjustable by movement of the assembly 58 on the shaft 60 which is positioned in the housing 136 that extends from the end portion 56 of the upper arm 134, as shown in FIG. 9.

As illustrated in FIG. 9, the shaft 60 is vertically positioned in the housing 136 and defines the Z-axis of movement of the marking head assembly 58 together with the marking device 12. Also the assembly 58 is pivotal to a preselected position about the Z-axis. The shaft 60 includes opposite end portions 166 and 168 that extend through support plates 170 and 172 of the housing 136. An upper bearing assembly generally designated by the numeral 174 is supported by the plate 170 in surrounding relation with the shaft end portion 166. The bearing assembly 174 includes a cap 176 positioned around a roller bearing 178. Positioned below the roller bearing 178 around the shaft upper end portion 166 is a thrust bearing 180. The thrust bearing 180 is retained in an arm 182 connected by a link 184 to the upper end portion of a guide bar 186. With this arrangement the bearings 178 and 180 form the bearing assembly 174 for rotatably supporting the shaft upper end portion 166 about the Z-axis.

In a similar arrangement, the shaft lower end portion 168 is also supported for rotation about the Z-axis by the provision of a thrust bearing 188 and a roller bearing 190. The roller bearing 190 is sealed within a cap 192 that is secured to the lower end of a sleeve 194 which is suitably connected to the support plate 172. Positioned above the sleeve 194 in surrounding relation with the shaft lower end portion 168 is the thrust bearing 188. The thrust bearing 188 is enclosed within an arm 196 which is connected by a link 198 to the lower end portion of the guide bar 186. With this arrangement the thrust bearing 188 and roller bearing 190 form a bearing assembly generally designated by the numeral 200 for the shaft lower end portion 168.

Positioned intermediate the respective shaft end portions 166 and 168 is a bracket generally designated by the numeral 202 in FIG. 9. The bracket 202 includes one end portion 204 connected by a ball screw drive generally designated by the numeral 206 to the output of motor 62 and a second end portion 208 connected to a sleeve 210 on shaft 60. The sleeve 210 is supported for vertical, reciprocal movement on the shaft 60 by upper and lower cylindrical bearings 212 and 214. The marking head assembly 58 is connected to the sleeve 210 to move therewith. The bearings 212 and 214 are maintained in a fixed position within the sleeve 210 around the shaft 60 by caps 216 and 218. The end portion 208 of the bracket 202 is nonrotatably connected to the sleeve 210. Also the bracket end portion 208 is supported by an upper washer assembly 220 and a lower washer assembly 222 on a housing 224 of the marking head assembly 58.

The ball screw drive 206, as shown in FIG. 9 for actuating vertical reciprocal movement of the sleeve 210 on the shaft 60, includes a ball screw guide 226 drivingly connected to a ball screw 228 which is rotated in a preselected direction by the motor 62. The ball screw 228 includes an upper end portion 230 and a lower end portion 232. The ball screw lower end portion 232 is supported by a thrust bearing 234 mounted in a bearing plate 236 which is secured to the lower portion of the housing 136 on the end of the upper arm 134. The extreme end of the ball screw lower end portion 232 is sealed within a shaft seal 238.

The upper end portion 230 of the ball screw 228 is also sealed by a shaft seal 240 and extends into driving engagement with a coupling 242. The coupling 242 is drivingly connected to an output shaft 244 of a right angle gear box 246. The gear box 246 is, in turn, connected by an air brake 248 to the motor 62. The motor 62 is preferably an air motor which is conventionally coupled to the air brake 248.

In one embodiment, the gear box 246 has a five to one ratio, and the drive shaft 244 of the gear box 246 is connected to the ball screw 228 having a 0.200 pitch or five threads per inch. Also, the ball screw 228 includes an encoder 250 drivingly connected through the gear box 246 to the ball screw upper end portion 230. The encoder provides 120 pulses per revolution, or 600 pulses per inch. In one arrangement the motor 62 is controlled by a pair of three-way solenoid valves (not shown), and the air brake 248 is also operated by a single three-way solenoid valve. When the solenoid valve of the air brake 248 is not energized, the brake is in a holding position.

Upon actuation of the motor 62 to rotate the ball screw 228 in a preselected direction, the ball screw guide 226 moves vertically on the ball screw 228 from the position illustrated by the solid lines in FIG. 9 to the position illustrated in phantom in FIG. 9. As can be seen, the position of the ball screw 228 is parallel to the Z-axis of the shaft 60. With this arrangement, upon movement of the ball screw guide 226 to a preselected position on the ball screw 228, the sleeve 210 is carried by the bracket 202 to a corresponding vertical position on the shaft 60.

The range of movement of the bracket 202 and the sleeve 210 on the shaft 60 is indicated by the position of the bracket 204 and the sleeve 210 shown in phantom in FIG. 9. The sleeve 210 is rigidly connected to the housing 224 of the marking assembly 58. Thus vertical reciprocal movement of the sleeve 210 generates vertical reciprocal movement of the marking head assembly 58 parallel to the Z-axis.

The shaft 60 is also supported in the housing 136 for rotational movement through a preselected angle about the shaft 60 to also rotate the marking head assembly 58. Rotation of the shaft 60 is accomplished by actuation of the piston cylinder assembly 64, illustrated in detail in FIGS. 9 and 11. The piston cylinder assembly 64 includes a cylinder portion 252 connected a swivel-type bracket 254 to a plate 256 of the housing 136. The plate 256 is, in turn, connected to a plate 258 secured to the end 56 of the upper arm 134. Also connected to the plate 256 is a shield 260 surrounding the motor 62.

The piston cylinder assembly 64 includes a piston rod 262 which is extensible and retractable relative to the cylinder portion 252. The end portion of the piston rod 262 is connected by a clevis joint 264 to an end portion 266 of a lever arm 268. The lever arm 268 includes an opposite end portion 270 nonrotatably connected by a key 272 to the upper end portion 166 of shaft 60.

The piston cylinder assembly 64 is preferably a double action assembly operated by a 4-way two position solenoid valve (not shown). Flow of air to the cylinder portion 252 is controlled by the solenoid valve to extend and retract the piston rod 262. Extension of the piston rod 262 to the position illustrated in phantom in FIG. 11 pivots the lever arm 268 through an angle to, in turn, rotate the shaft 60 about the Z-axis through a preselected degree of rotation, for example 90° from the retracted position of piston rod 262 to the extended position of piston rod 262. In this manner the marking head assembly 58 is rotated 90° about the shaft 60 from the position illustrated in FIG. 11 to the position illustrated in FIG. 1.

Once the marking head assembly 58 has been moved to position the marking device 12 for marking a selected surface of the workpiece, such as a billet on the roll table 18, the marking head assembly 58 is locked in the desired pivoted position by a locking device generally designated by the numeral 274 in FIG. 11. The locking device 274 includes a double acting cylinder 276 having an extensible cylinder head 278 reciprocally mounted in a slide 280 which is mounted on the housing 136. The cylinder head 278 has a wedge-like configuration adapted to be received within mating configured recesses 281 or 282 positioned on the periphery of the lever end portion 270 which is keyed to the shaft upper end portion 166.

A pair of recesses 281 and 282 is shown in FIG. 11, but it should be understood that any number of recesses can be spaced around the periphery of the lever end portion 270. The recesses 281 and 282 are spaced 90° apart. With this arrangement the marking head assembly 58 can be locked in a first position, as illustrated in FIG. 11, or a second position, as illustrated in FIG. 2.

To lock the marking head assembly 58 in the pivoted position illustrated in FIG. 11, the cylinder 276 is actuated, preferably by a 4-way two position solenoid operated, spring return valve (not shown) to extend the cylinder head 278 into engagement with the recess 282. Accordingly, if it is desired to reposition the marking head assembly 58, the cylinder head 278 is retracted from recess 282 and the piston rod 262 is extended to rotate the marking head assembly 58, 90° about the shaft 60. In this position the cylinder head 278 is positioned oppositely of recess 281. The rotated position of the marking head assembly 58 is then locked by actuating the double acting cylinder 276 to extend the cylinder head 278 into the recess 281. Thus with this arrangement the marking head assembly 68 is movable between a first position, as illustrated in FIG. 1 for end marking of a billet, and a second position, as illustrated in FIG. 11 for side marking of a billet.

As above described, the marking head assembly 58 is rotatable with the shaft 60 about the Z-axis. The nonrotatable connection of the shaft 60 to the marking head assembly 58, as illustrated in FIG. 9, is accomplished by the connection of the arms 182 and 196 by pins 284 and 286 to the shaft 60. The arms 182 and 196 are connected by the links 184 and 198 to the guide bar 186. The guide bar 186 passes through a cylindrical bearing 288 retained with the housing 224 of the marking head assembly 58. With this arrangement when the shaft 60 rotates, the marking head assembly 58 also rotates through a corresponding angle.

Further in accordance with the present invention, the guide bar 186 and the cylindrical bearing 288 facilitate vertical movement of the marking head assembly 58 on the shaft 60. Upon rotation of the ball screw 228 the ball screw guide 226 moves vertically on the ball screw 228. The housing 224 of the marking head assembly 58 moves vertically with the bracket 202 and the ball screw guide 226. The sleeve 210 is carried by the bracket 202 and is connected, as above described, to the housing 224 of the marking head assembly 58. The sleeve 210 thus moves vertically along the Z-axis and carries with it the marking head assembly 58. The vertical movement of the marking head assembly housing 228 is guided by movement of the cylindrical bearing 288 on the guide bar 186.

As illustrated in FIGS. 9–11, the interior of the housing 136 where the motor 62 and the piston cylinder assembly 64 are located is accessible by a pivotal housing cover 290. The housing cover 290 has been removed in FIG. 11 for clarity of illustration of the motor 62 and piston cylinder assembly 64. As shown in FIG. 10, the housing cover 290 is pivotally connected by a pin 292 to a hinge 294 mounted on the housing 136. In a similar arrangement the interior of the marking head assembly housing 224 is accessible through a housing door 296 pivotally connected by a pin 298 to a hinge 300. The door 296 is maintained closed by a latch 302.

The marking head assembly housing 224 depends downwardly from its mounting on the shaft 60. The housing 224 forms an enclosure 304 for receiving the marking device 12. As shown in FIG. 9, the housing 224 includes a front wall 306 and a rear wall 308 connected to top and bottom walls 310 and 312 and side wall 314. Positioned at the base of side wall 314 is a head plate 316 which is connected by a bracket 318 to a sensor bar 320 for the marking device 12. The bracket 318 is supported by a bearing on the head plate 316 to permit pivotal movement of the bracket 318 about a pin 322 to provide adjustments in the angular position of the sensor bar 320 with respect to the objects to be marked on the roll table 18.

One type of marking device 12 suitable for use with the present invention is a commercially available printhead for indenting the surface of the objects to be marked on the roll table 18 by dot matrix type markings, such as alphanumeric characters. In addition, a printhead, known as a spray paint marker, can also be utilized with the present invention to spray paint from nozzles onto the surface of the objects to be marked to form dot matrix characters. Contact and non-contact markers suitable for use with the present invention are available from M. E. Cunningham Company, Ingomar, PA 15127.

The impact or contact type marker (not shown) includes a plurality of impact pins which are reciprocally mounted in a manifold connected to the head plate 316. With a non-contact type marking device, such as a spray paint marker, an array of spray nozzles are mounted in a manifold, which is also mounted on the head plate 316. With a contact or indentation type marking device, impact pins are arranged in alignment and spaced a preselected distance apart. Each pin is associated with one of a plurality of electrically operated solenoid valves supported by the manifold. The solenoid valves are operable to extend and retract the pins in a controlled manner to indent the surface of the object to be marked on the roll table 18 with dots to form a single-line dot matrix array of characters.

To accommodate the extension and retraction of the pins, the sensor bar 320 as illustrated in FIG. 10 is provided with a plurality of apertures 324 which are aligned oppositely from the corresponding pins. Upon actuation of the respective solenoids, the pins extend through the apertures 320 into contact with the surface of the object to be marked. In a similar arrangement for a spray paint marker, spray nozzles are positioned oppositely of the apertures 324 so that upon actuation of the respective nozzles a spray of paint is projected through the apertures 324 in a controlled manner onto the surface of the object to be marked to form a dot matrix array characters.

Thus with both the contact and non-contact marking devices 12, the respective pins or nozzles are actuated in a controlled sequence to print a selected array of dot matrix characters a line at a time on the surface of the object to be marked. The characters indented or sprayed on the surface of the object are symmetrical about a longitudinal axis. The height of the characters is determined by the angle of inclination of the marking device 12 relative to the longitudinal axis of the objects to be marked on the surface of the roll table 18. As shown in FIG. 10, the marking device 12 is positioned at an angle with respect to the surface 326 of the roll table 18. Accordingly, the sensor bar 320 is positioned at a corresponding angle so that regardless of the angle of inclination, the pin or paint spray passes through the apertures 324.

Preferably when in the marking position, the impact pins or spray nozzles are positioned a preselected distance from the surface of the object to be marked. Accordingly, the marking head assembly 58 is moved to a position where the sensor bar 320 contacts the surface of the object to be marked. Preferably the upper arm 134 is moved by operation of the motor 52 to advance the marking head assembly 58 to a position where the sensor bar 320 contacts the surface of the object to be marked. Contact of the sensor bar 320 with the surface of the object to be marked stops the horizontal movement of the upper arm 134 along the Y-axis. At this point the marking device 12 is ready for actuation, and preferably the upper arm 134 is incrementally retracted so that the sensor bar 320 is not in direct contact with the surface of the object to be marked but is at least, for example, 1/16 inch spaced from the object.

Once the marking device 12 is in position for marking, the solenoid valves for actuating either the pins or the spray nozzles are actuated to print characters formed by dots on the surface. In both cases the dots formed by indentations or paint spray are spaced a preselected distance apart to form a selected array of dot matrix characters. The selection of characters to be inscribed on the surface of the object to be marked on the roll table 18 is programmable from a data entry terminal located remotely from the roll table 18.

The apparatus for selecting the dot matrix characters for either the contact or non-contact type marking devices is located at an operator's terminal which is connected to a computer operated controller. The controller generates data and character signals which are transmitted to the marking device 12 for controlling operation of the solenoid valves to control movement of the impact pins into and out of contact with the surface of the object or control the spray of paint from the spray nozzles.

The operator enters the selected characters to be impressed or sprayed on the object to be marked at the computer terminal. The input data is compiled by the controller, and corresponding output signals are transmitted to the marking device 12 for operation of the electrically actuated solenoid valves in an on and off manner. The solenoid valves control the flow of pressurized air to the manifold for reciprocating the impact pins or actuating the spray nozzles.

As shown in FIG. 9, an air supply line 328 is connected to a fitting 330 mounted on the manifold of the marking device 12. The solenoid valves then control the flow of air under pressure to the respective impact pins or the nozzles to extend the pins to impact the surface or to actuate a spray from the nozzles to form by indentation or spraying an array of dots on the surface of the object to be marked. A return air line 332 is connected to a fitting 334 also mounted on the manifold of the marking device 12 and constantly supplies at a pressure less than the air pressure in the air supply line 328 to the pins or nozzles to maintain the pins in a normally retracted position or to maintain the nozzles closed. The air supply pressure exceeds the return air pressure. Thus when the respective solenoid valves are opened, the pins are extended or the nozzles are opened. When the solenoid valves are closed, the air supply is cut off and the constant return air supply acts against the pins to retract the pins from the surface or to close the nozzles.

While the above described marking apparatus 10 is adaptable for use in both contact and non-contact type dot matrix devices, other known marking devices can be utilized with the present invention. For example, the marking head assembly 58 is adaptable to operatively support both single and multiple marking wheels that include a plurality of marking characters or elements on the peripheral surface thereof.

A single wheel marker adaptable for use with the present invention is illustrated and described in U.S. Pat. Nos. 4,214,520 and 4,410,287. Marking devices that include a plurality of marking wheels for marking roll stock and the like are disclosed in U.S. Pat. Nos. 3,306,186; 3,541,954; and 3,636,871. Accordingly, it should be understood that the marking apparatus 10 of the present invention for moving the marking assembly 58 in a plurality of planes along a plurality of axes is not limited to the use of contact or non-contact markers but is also adaptable for use with the known marking wheel type markers. The details of marking wheel type markers is beyond the scope of the present invention.

Further in accordance with the present invention, the apparatus 10 is adaptable for positioning any type of machine to be carried on the assembly 58 into a preselected position for carrying out a specific function. For example, the assembly 58 can be adapted to automatically position a welding machine for welding components positioned on the roll table 18. In another embodiment of the present invention the assembly 58 can be adapted to carry a cutting tool to carry out machining operations. These and other types of automated manufacturing processes can be carried out by the present invention.

Regardless of the type of marking device 12 utilized on the marking head assembly 58, the marking head assembly 58 is pivotal to a preselected position for impressing the desired mark on a preselected surface of the object to be marked on the roll table 18. For example, in the case of billets, slabs, bars, ingots, or the like, end marking or side marking can be accomplished by pivoting the marking head assembly 58 on the upper arm end 134. Once the marking head assembly 58 is in the desired position, it is locked in place by the engagement of the cylinder head 278 within one of the recesses 281 or 282 for the locking device 274 associated with the shaft 60 as above discussed.

To carry out end marking of a billet for example, the marking head assembly 58 and marking device 12 is pivoted by operation of the piston cylinder assembly 64 to the position where the marking head assembly 58 is at an angle of 90° relative to the base 22. The marking head assembly 58 is illustrated in FIGS. 1 and 2 in the end marking position. Once the marking head assembly 58 is locked in this position, the motor 62 is actuated to rotate the ball screw 228, shown in FIG. 9, in a preselected direction to advance the ball screw guide 226 to a preselected position on the ball screw 228, for example the position of the guide 226 illustrated in FIG. 9.

The marking head assembly 58 through its connection by the bracket 202 to the ball screw guide 226 moves vertically on the shaft 60. In this manner the marking head assembly 58 is moved to the desired position on the shaft 60 to locate the marking device 12 at the desired height for marking the billets on the roll table 18. Horizontal movement of the carriage 46 on the main beam 68 in a preselected direction is then accomplished by actuation of the motor 48. The carriage 46 is moved horizontally along the X-axis "left" or "right" relative to the roll table 18. The carriage 46 is in the "home" or "extreme right" position as illustrated in solid in FIG. 2. The "left" horizontal position of the carriage 46 is illustrated in phantom in FIG. 2.

As well known in the art, conventional roll tables include stop mechanisms for interrupting the conveying action of the table. When the billet engages the stop, the stop is lowered and the table will not be run. The stop cannot be raised until the marking head assembly 58 is raised out of the marking position.

Accordingly, once the billet has engaged the stop of the roll table and the stop has lowered, the piston cylinder assembly 66 is actuated to pivot the main beam 68 to move the marking head assembly 58 downwardly in an arcuate path from the position illustrated in phantom to the position illustrated in solid lines in FIG. 1. The marking head assembly 58 is then moved to a preselected position relative to the center line of the roll table 18 by horizontal in and out movement of the upper arm 134 relative to the carriage 46. The motor 52 is actuated to advance the upper arm 134 in the out direction along the Y-axis toward the roll table 18.

The carriage 46 is moved horizontally on the main beam 68 along the X-axis to a position where the sensor bar 320 contacts the end of the billet to stop the drive of the roll table 18 and movement of the carriage 46 on the main beam 68. The marking device 12 is then in the marking position for end marking. The marking device 12 is then actuated to inscribe the desired identification mark or message on the end of the billet. After the marking operation is completed, the marking head assembly 58 is retracted away from the billet by actuating the motor 48 to move the carriage 46 on the main beam 68 from left to right, i.e. from the position of the carriage 46 illustrated in phantom in FIG. 2 to the position of the carriage 46 illustrated in solid. Thereafter the lift cylinder 66 is actuated to lift or move the marking head assembly 58 in an arcuate path from the position of the upper arm 134 illustrated in solid in FIG. 1 to the position illustrated in phantom in FIG. 1.

Once the marking head assembly 58 has been lifted to the raised position, the horizontal drive motor 52 is actuated for horizontal "in-out" movement of the marking head assembly 58. After the marking operation, the upper arm 134 moves to the in position which is away from the roll table 18. A suitable length of travel of the marking head assembly 58 upon retraction of the upper arm 134 is 6 inches from the center line of the roll table 18. Once the marking assembly 58 is raised, the roll table 18 immediately begins to convey the billets. When the next successive billet is advanced against the stop, the stop is lowered and the above described cycle of movement of the marking head assembly 58 is repeated. The marking head assembly 58 is moved to a position where the sensor bar 320 abuts the billet, the billet is marked, and the marking device 12 is raised out of the marking position.

Side marking of a billet is also performed by the marking apparatus 10 of the present invention. Initially the marking head assembly 58 is pivoted to the side marking position by actuation of the piston cylinder assembly 64 to retract the piston 262 into the cylinder 252 to position the sensor bar 320 in the position illustrated in FIGS. 9 and 11. The marking head assembly 58 is then locked into position by extension of the cylinder head 278 into the recess 282 to lock the position of the marking head assembly on the shaft 60. Thereafter the marking head assembly 58 is moved to the desired position on the shaft 60 for adjusting the height of the marking device 12 for side marking of a billet. The positioning cycle is initiated with the upper arm 134 in the "home" or in position. Also, the carriage 46 is advanced on the main beam 68 to its rightmost or "home" position.

At the point when the billet has engaged the stop of the roll table 18 and the stop has lowered, the table will not operate, and steps can be taken to suitably clamp the billet if required. Thereafter the carriage 46 is then advanced from its "home" position, as illustrated in phantom in FIG. 2, a preselected distance along the X-axis, for example to the position of the carriage 46 illustrated in solid in FIG. 2. The upper arm 134 is then advanced along the Y-axis toward the billet on the roll table until the sensor bar 320 contacts the billet. At this point the horizontal in-out movement is terminated, and the marking device 12 is in position for marking. If desired, the upper arm 134 can be retracted an incremental amount to remove the sensor bar 320 from immediate contact with the billet. Once the marking operation is complete, the upper arm 134 is retracted to the "home" position, and the roll table 18 is actuated automatically to convey the next billet in position for marking. Also at this time the carriage 46 is advanced to its "home" position on the main beam 68.

According to the provisions of the patent statutes, I have explained the principle, preferred construction and mode of operation of my invention, and have illustrated and described what I now consider to represent its best embodiment. However, it should be understood that within the scope of the appended claims, the invention may be practiced otherwise than as specifically illustrated and described.

I claim:

1. Apparatus for supporting a marking device for movement into and out of position for marking the surface of an object which is one of a plurality of said objects being moved along a path relative to said apparatus comprising,
   a base including in a generally horizontal reference plane,
   a lower support member positioned on said base, said lower support member having a surface extending in a first plane generally above said base,
   a carriage mounted on said lower support member for movement in a preselected first direction parallel with said first plane and said horizontal reference plane,
   first drive means drivingly connected to said carriage for said movement of said carriage to a preselected position on said lower support member,
   an upper support member supported by said carriage for movement relative to said carriage in a second plane parallel with and a predetermined distance from said first plane in a preselected second direction which is transverse with respect to said preselected first direction,
   second drive means drivingly connected to said upper support member for said movement of said upper support member to a preselected position relative to said carriage on said lower support member,
   a marking device mounted on said upper support member for movement in a preselected third direction which is perpendicular to said first and said second planes to a preselected position relative to said upper support member, and
   means for selectively tilting said lower support member about a first axis which is parallel to said horizontal reference plane, said tilting being relative to said base to adjust a relative position of said marking device out of said path of said plurality of said objects.

2. Apparatus as set forth in claim 1 in which,
   said lower support member includes a beam having said beam surface extending above said base and parallel with said first plane,
   said carriage including a housing mounted on said beam surface, and
   means for supporting said housing of said carriage for rectilinear reciprocal said movement on said beam surface.

3. Apparatus as set forth in claim 2 in which,
   said first drive means includes a motor mounted on said beam, and
   means extending from said motor for drivingly connecting said motor to said carriage such that said carriage is capable of being advanced to said preselected position on said beam upon actuation of said motor.

4. Apparatus as set forth in claim 1 in which,
   said second drive means includes a motor mounted on said upper support member, and
   means extending from said motor for drivingly connecting said motor to said carriage such that said upper support member is capable of being advanced in said second plane in said preselected second direction to said preselected position relative to said carriage.

5. Apparatus as set forth in claim 1 in which,
   said means for connecting said marking device to said upper support member includes a marking head assembly,
   said upper support member includes a longitudinally extending arm having a first end portion and a second end portion, and
   said marking head assembly is pivotally and slidably connected to said first end portion for said movement of said marking head assembly in said third direction and about a second axis of rotation extending in said third direction.

6. Apparatus as set forth in claim 1 which includes,
   a shaft mounted on said upper support member,
   said shaft defining a second axis extending in said third direction on said upper support member,
   means for mounting said marking device on said shaft for said movement along said second axis in said third direction, and
   means for mounting said marking device on said shaft for pivotal movement about said second axis.

7. Apparatus as set forth in claim 6 which includes,
   third drive means mounted on said upper support member for rectilinearly moving said means for mounting said marking device on said shaft to said preselected position along said second axis to locate said marking device at a preselected height above said base with respect to said surface of said object to be marked when said lower support member is not being tilted by said means for tilting to adjust said relative portion of said marking device.

8. Apparatus as set forth in claim 6 which includes,
   means mounted on said upper support member for rotating said shaft through a preselected angle about said second axis to move said marking device to a preselected pivoted position on said upper support member.

9. Apparatus as set forth in claim 1 which,
   said means for selectively tilting includes actuating means mounted on said base and connected to said lower support member for moving said lower support member to a preselected tilted position about said first axis, and
   said carriage and said upper support member are capable being tilted with said lower support member to move said marking device through an arcuate path about said first axis into and out of said position for said marking relative to said surface of said object to be marked.

10. Method for supporting a marking machine on a frame for movement into and out of position for marking the surface of an object which is at a fixed location relative to said frame, said object being one of a plurality of said objects being moved along a path relative to said frame to said fixed location for said marking and from said fixed location after said marking, said method comprising the steps of, operably supporting said marking machine on said frame for movement into marking relation with said surface of said object at said fixed location to be marked, moving said morking machine on said frame in a first direction toward said surface of said object and perpendicular thereto, moving said marking machine on said frame in a second direction which is parallel to said surface and perpendicular to said first direction, marking said surface of said object with said marking machine during said moving said marking machine in said second direction, and angularly adjusting said marking machine on said frame after said marking to a stand-by position different from said position and out of said path of said plurality of said objects.

11. the method for supporting a marking machine as set forth in claim 10, wherein said operably supporting said marking machine on said frame includes moving said marking machine in a third direction to a predetermined position above said frame in alignment with a portion of said surface to be marked.

12. The method for supporting a marking machine as set forth in claim 11, wherein said operably supporting said marking machine on said frame for said movement into said marking relation includes said frame being maintained in a first horizontal plane, said moving said marking machine in said third direction includes vertically moving said marking machine above said first horizontal plane, and said moving said marking machine in said first direction and said moving said marking machine in said second direction occurs in a second horizontal plane above said first horizontal plane.

13. the method for supporting a marking machine as set forth in claim 10, wherein said angularly adjusting said marking machine includes tilting said marking machine about an axis which is parallel with said first direction.

14. The method for supporting a marking machine as set forth in claim 10, including moving said object along said path away from said fixed location after said angularly adjusting said marking machine to said stand-by position, moving another said object along said path to said fixed location to be marked by said marking machine, and angulary adjusting said marking machine on said frame from said stand-by position to said position for said marking said surface of said another object.

* * * * *